United States Patent
Chang et al.

(10) Patent No.: US 8,421,989 B2
(45) Date of Patent: Apr. 16, 2013

(54) LIQUID CRYSTAL LENS

(75) Inventors: Chi-Lone Chang, Hsinchu County (TW); Chi-Yuan Chin, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 393 days.

(21) Appl. No.: 12/944,728

(22) Filed: Nov. 12, 2010

(65) Prior Publication Data
US 2012/0075569 A1    Mar. 29, 2012

(30) Foreign Application Priority Data

Sep. 24, 2010  (TW) ................................ 99132443 A

(51) Int. Cl.
*G02F 1/13*      (2006.01)
(52) U.S. Cl.
USPC ........................................................ 349/200
(58) Field of Classification Search .................. 349/200, 349/13, 193
See application file for complete search history.

(56) References Cited

U.S. PATENT DOCUMENTS

| | | | |
|---|---|---|---|
| 6,577,376 B1 | 6/2003 | Shih | |
| 6,690,500 B2 | 2/2004 | Ogasawara et al. | |
| 6,864,951 B1 | 3/2005 | Ren et al. | |
| 7,715,297 B2* | 5/2010 | Heor et al. | 369/112.02 |
| 7,787,063 B2* | 8/2010 | Hirose | 349/2 |
| 8,248,576 B2* | 8/2012 | Chang | 349/200 |
| 2006/0164593 A1* | 7/2006 | Peyghambarian et al. | 349/200 |
| 2011/0249206 A1* | 10/2011 | Liu et al. | 349/33 |
| 2012/0026451 A1* | 2/2012 | Nystrom | 349/200 |

OTHER PUBLICATIONS

Mao Ye et al., "Liquid-crystal lends with a focal length that is variable in a wide range", 2004 Optical Society of America, Dec. 10, 2004, vol. 43, No. 35, Applied Optics, P6407-P6412.

\* cited by examiner

*Primary Examiner* — Edward Glick
*Assistant Examiner* — Dennis Y Kim
(74) *Attorney, Agent, or Firm* — Jianq Chyun IP Office

(57) ABSTRACT

A liquid crystal lens including a plurality of electrodes and a substrate is provided. A plurality of parallel electric fields is formed by controlling the potentials of the electrodes, so as to speed up the mechanism for toppling the liquid crystal molecules. In other words, the liquid crystal lens has a high respond time. In addition, a plurality of active devices is disposed at the sides of the electrodes in the liquid crystal lens, in which the active devices are electrically connected to the electrodes. When the active devices are driven, a current is formed on the electrodes, so as to raise the temperature of the liquid crystal lens. Accordingly, the liquid crystal lens can be operated in a low temperature environment.

20 Claims, 9 Drawing Sheets

LIQUID CRYSTAL LENS

CROSS-REFERENCE TO RELATED APPLICATION

This application claims the priority benefit of Taiwan application serial no. 99132443, filed on Sep. 24, 2010. The entirety of the above-mentioned patent application is hereby incorporated by reference herein and made a part of this specification.

BACKGROUND OF THE INVENTION

1. Field of the Invention

The invention generally relates to a liquid crystal lens, and more particularly to a liquid crystal lens having a preferable response speed suitable for operation under a low temperature environment.

2. Description of Related Art

Nowadays, camera module technologies are advancing toward a direction of superior image quality having millions of pixels and a high resolution packaged in a small volume. This has brought new applications for camera modules in mobile phones and increased the desire for consumer purchases. Moreover, among the functions which are gradually becoming commonplace in a mobile phone camera, the foremost in importance would be the auto-focus function. Generally speaking, if the camera resolution is above 1.3 million pixels, the pixel area of the image detector is reduced. Moreover, an image captured by a typical fixed-focus camera lens does not have sufficient depth of field for both far and short distances at the same time, and therefore the camera must rely on the auto-focus function to obtain a clear image quality. Since the mobile camera must be compact and thin, auto-focus on the mobile camera cannot be implemented by the conventional motor driven lens module for a typical digital camera, but must employ a more miniature and compact actuator device to achieve the purpose.

Actuator devices of mobile camera lens modules that are currently applied include the voice coil motor (VCM), the piezoelectric actuator, and the miniature step motor. In addition, the liquid lens may be adopted, which employs a voltage control to alter surface tension so as to change the lens curvature and the focusing characteristics. Moreover, the liquid crystal lens may also be adopted, which employs a voltage control to alter electric field distribution so as to change the refractive index of the lens and the focusing characteristics. However, each of these implementations for achieving auto-focus has its own drawbacks. For example, when adopting the mechanical actuator devices, the material cost, assembly precision, and anti-shock characteristics are keys. On the other hand, when adopting the static liquid lens, then the manufacturing techniques and the optical imaging quality are major challenges. In addition, liquid crystal lenses have a slow response speed and are not suitable for a low temperature operating environment. Therefore, an important research and development focus is finding a preferable technique which is adaptable on the mobile phone camera module for implementing auto-focus.

Over the years, numerous documents have disclosed various types of liquid crystal optical device techniques, in which the optical characteristic of the liquid crystal material with its refractive index changing relative to an externally applied voltage is utilized to alter the focal distance of the lens, and these techniques, are being applied in various product ranges. For example, U.S. Pat. No. 6,864,951 discloses combining inhomogeneous polymer dispersed liquid crystals (PDLC) with ultraviolet (UV) light illumination so as to form droplets of uneven size from liquid crystal molecules. Moreover, the optical focusing characteristic is continuously modulated by variation of the externally applied voltage. Additionally, an article in the international journal Applied Optics (Vol. 43, No. 35, p. 6407, December, 2004) discloses designing the electrodes at the other side of a glass which is far thicker than the liquid crystal dielectric layer. By applying a large voltage and penetrating the potential distribution through the glass, a continuously curved surface distribution is formed in the liquid crystal dielectric layer. Accordingly, the liquid crystal refractive index has a continuous distribution much like a lens with a continuous phase distribution, and the liquid crystal lens has good focusing characteristic and a simple device structure. However, the driving voltage needs to be 100 V, and the response speed needs to be increased. In previously described conventional liquid crystal optical devices such as U.S. Pat. Nos. 6,577,376 and 6,690,500, since the diffraction device designs employ strip shape blocks or Fresnel lens, each diffractive step generated by diffraction lowers the overall utilization efficiency of the light beam. On the other hand, U.S. Pat. No. 6,864,951 discloses a PDLC framework, although due to the strict nature of the UV light exposure process, and other factors such as a low medium transmittance from diffraction and a high device driving voltage, the response speed problem remains an issue.

SUMMARY OF THE INVENTION

Accordingly, the invention is directed to a liquid crystal lens having a preferred response speed and a preferred optical focusing capability. Moreover, the liquid crystal lens is adapted for operation in a low temperature environment.

An embodiment of the invention provides a liquid crystal lens, including a first substrate, a plurality of first active devices, a plurality of first electrodes, a first alignment layer, a second substrate, a second active device, a second electrode, a second alignment layer, a liquid crystal layer, and a polarizer. The first active device is disposed on the first substrate. The first electrodes are disposed on the substrate and arranged in parallel to each other. The first electrodes are respectively electrically connected to the corresponding first active devices. The first alignment layer is disposed on the first substrate and covers the first electrodes. The second substrate is disposed opposite to the first substrate. The second active device is disposed on the second substrate. The second electrode is disposed on the second substrate and electrically connected to the second active device, and the second electrode has an opening. The second alignment layer is disposed on the second substrate. The liquid crystal layer disposed between the first substrate and the second substrate, and the first alignment layer and the second alignment layer align the liquid crystal layer. The polarizer is disposed at a side of the second substrate, and the second substrate is disposed between the first substrate and the polarizer.

According to an embodiment of the invention, the liquid crystal lens further includes a plurality of third active devices disposed on the first substrate and respectively electrically connected to the corresponding first electrodes. When the first active devices and the third active devices are simultaneously driven, a current is respectively generated on the first electrodes. The current flowing through the first electrodes raises a temperature of the first electrodes.

According to an embodiment of the invention, each of the first active devices includes a gate, an active layer, a source, and a drain. The drain is electrically connected to the corresponding first electrode, and when the gate is driven, the source and the drain are electrically connected to each other through the active layer.

According to an embodiment of the invention, the second active device includes a gate, an active layer, a source, and a drain. The drain and the second electrode are electrically connected, and when the gate is driven, the source and the drain are electrically connected to each other through the active layer.

According to an embodiment of the invention, a potential distribution applied on the first electrodes has alternating high-low levels, so as to respectively form a parallel electric field between the first electrodes.

According to an embodiment of the invention, the potentials applied on the first electrodes are the same with each other, and different from a potential applied on the second electrode According to an embodiment of the invention, when a plurality of second active devices are configured, the liquid crystal lens further includes at least one ring shaped electrode disposed in the opening, and the second active devices are respectively electrically connected to the second electrode and the corresponding ring shaped electrode.

According to an embodiment of the invention, the second electrode is disposed at a side of the second substrate, and the second alignment layer is disposed at another side of the second substrate.

According to an embodiment of the invention, the first active devices and the second active device share a same driving power source, or different driving power sources are used respectively.

According to an embodiment of the invention, the liquid crystal lens further includes a sealant disposed between the first substrate and the second substrate, so as to respectively retain a containing space between the first alignment layer and the second alignment layer, in which the liquid crystal layer is disposed in the containing space.

An embodiment of the invention provides a liquid crystal lens, including a first substrate, a first active device, a first electrode, a third active device, a first alignment layer, a second substrate, a second active device, a second electrode, a second alignment layer, a liquid crystal layer, and a polarizer. The first active device is disposed on the first substrate. The first electrode is disposed on the first substrate and electrically connected to the first active device. The third active device is disposed on the first substrate and electrically connected to the first electrode. When the first active device and the third active device are simultaneously driven, a current is generated on the first electrode. The current flowing through the first electrode raises a temperature of the first electrode. The first alignment layer is disposed on the first substrate and covers the first electrode. The second substrate is disposed opposite to the first substrate. The second active device is disposed on the second substrate. The second electrode is disposed on the second substrate and electrically connected to the second active device, and the second electrode has an opening. The second alignment layer is disposed on the second substrate. The liquid crystal layer disposed between the first substrate and the second substrate, and the first alignment layer and the second alignment layer align the liquid crystal layer. The polarizer is disposed at a side of the second substrate, and the second substrate is disposed between the first substrate and the polarizer.

According to an embodiment of the invention, when a plurality of second active devices are configured, the liquid crystal lens further includes at least one ring shaped electrode disposed in the opening, and the second active devices are respectively electrically connected to the first electrode and the corresponding ring shaped electrode.

According to an embodiment of the invention, the at least one ring shaped electrode disposed in the opening is arranged as a concentric circle.

According to an embodiment of the invention, at least a part of the potentials applied on the second electrode and the at least one ring shaped electrode are the same.

According to an embodiment of the invention, the potentials applied on the second electrode and the at least one ring shaped electrode are the different.

According to an embodiment of the invention, an alignment direction of the first alignment layer is parallel and reverse to an alignment direction of the second alignment layer, or the alignment direction of the first alignment layer is perpendicular to the alignment direction of the second alignment layer.

In summary, in the liquid crystal lens according to the embodiments of the invention, a plurality of first electrodes are disposed on the first substrate, and by adjusting the potentials on the first electrodes and generating a parallel electric field, the mechanism for toppling the liquid crystals is sped up. In other words, the liquid crystal lens has a fast response time. In addition, other active devices may be disposed on the first substrate of the liquid crystal lens according to the embodiments of the invention. These active devices are electrically connected to the first electrodes and are adapted to generate a current with another active device on the first electrodes. Accordingly, the temperature of the liquid crystal layer is increased, and therefore the liquid crystal lens can be suitable for operation in a low temperature environment.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
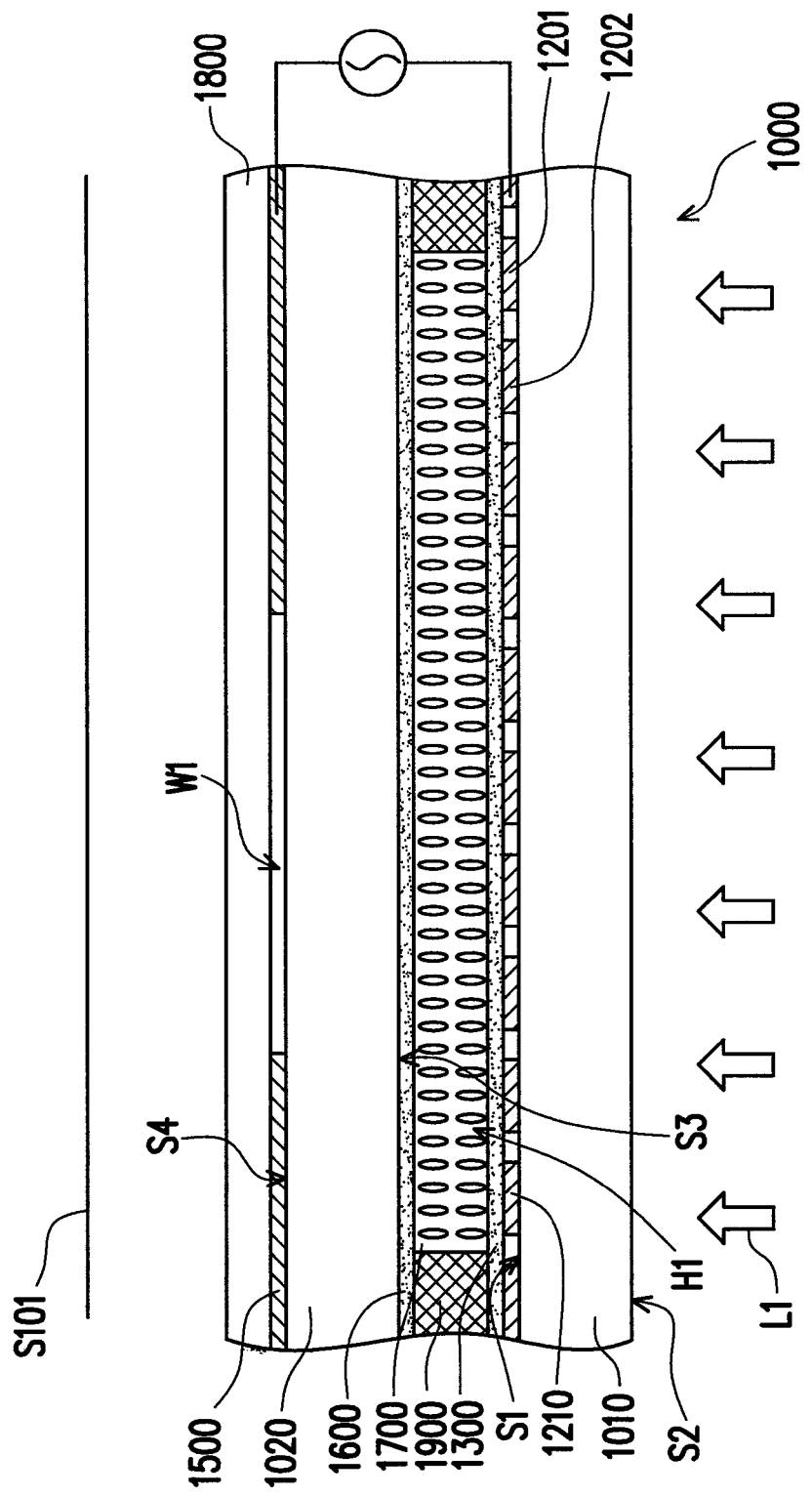
FIG. 1 is a partial schematic view of a liquid crystal lens according to an embodiment of the invention.
Figure 2A:
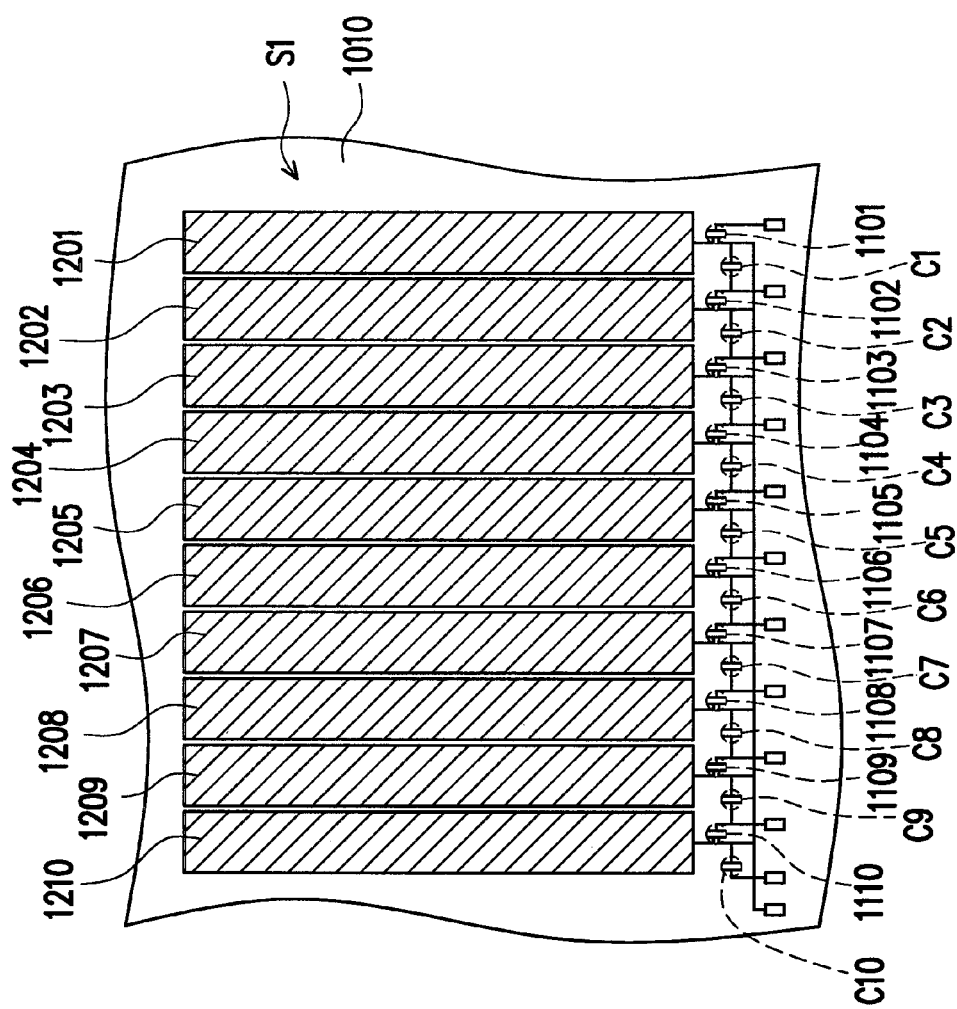
FIG. 2A is a partial schematic view of a first active device and a first electrode disposed on a first substrate depicted in FIG. 1.
Figure 2B:
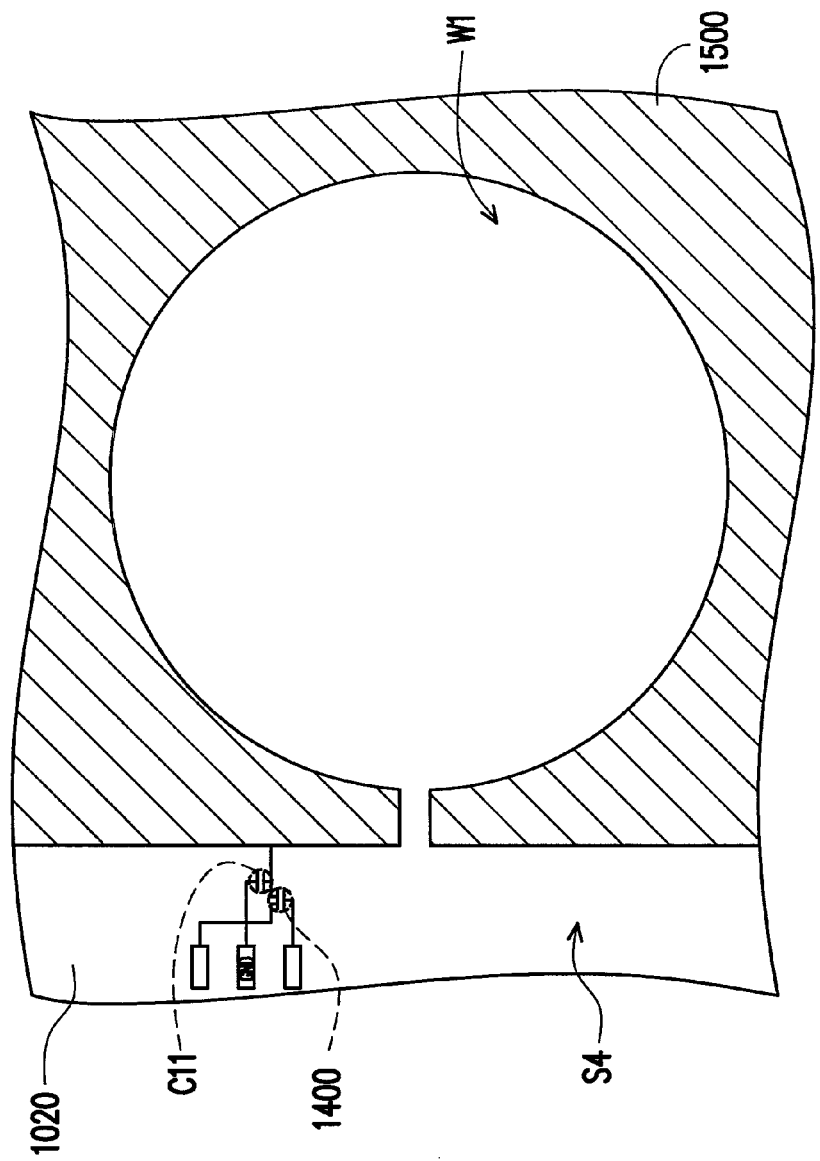
FIG. 2B is a partial schematic view of a second active device and a second electrode disposed on a second substrate depicted in FIG. 1.
Figure 2C:
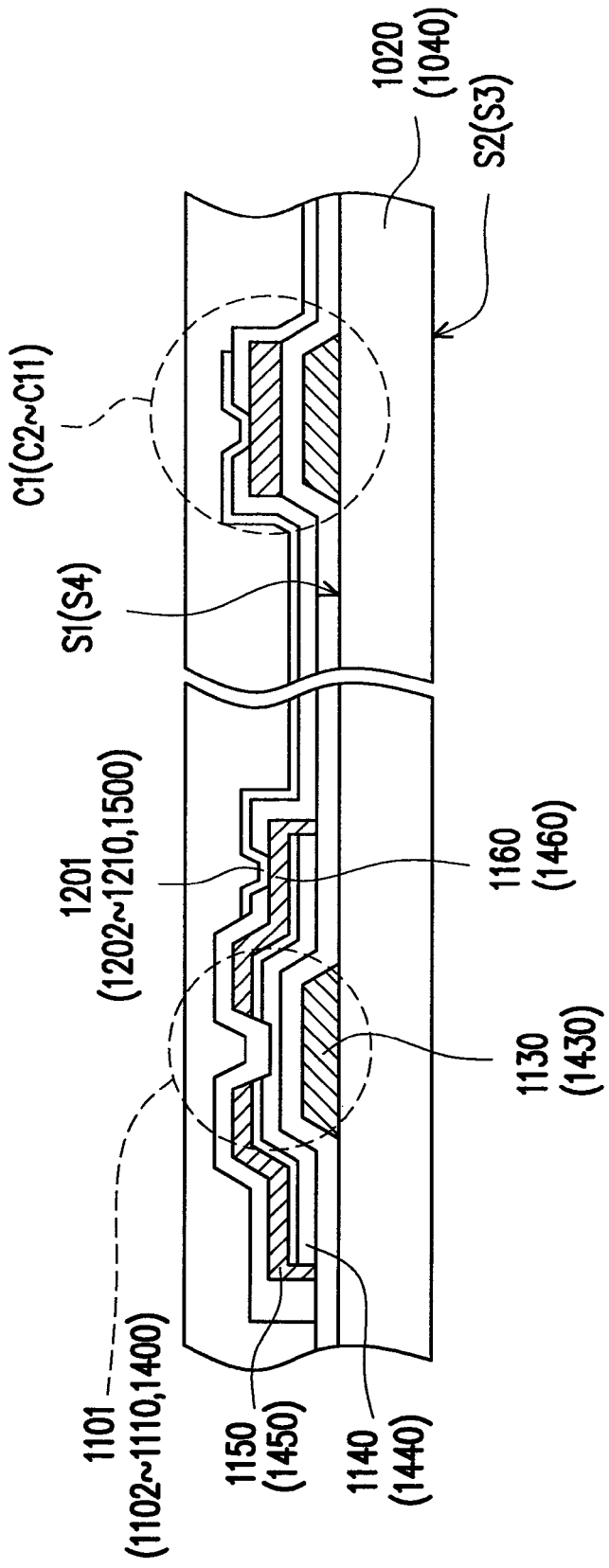
FIG. 2C is a partial schematic view of the first active device disposed on the first substrate or the second active device disposed on the second substrate depicted in FIG. 1.

FIG. 1 is a partial schematic view of a liquid crystal lens according to an embodiment of the invention. FIG. 2A is a partial schematic view of a first active device and a first electrode disposed on a first substrate depicted in FIG. 1. FIG. 2B is a partial schematic view of a second active device and a second electrode disposed on a second substrate depicted in FIG. 1. FIG. 2C is a partial schematic view of the first active device disposed on the first substrate or the second active device disposed on the second substrate depicted in FIG. 1. Referring to FIGS. 1 and 2A-2C, a liquid crystal lens 1000 of the present embodiment includes a first substrate 1010, a plurality of first active devices 1101-1110, a plurality of first electrodes 1201-1210, a first alignment layer 1300, a second substrate 1020, a second active device 1400, a second electrode 1500, a second alignment layer 1600, a liquid crystal layer 1700, and a polarizer 1800.

In the embodiment, the first substrate 1010 has a first surface S1 and a second surface S2, and the first substrate 1010 is a transparent substrate such as a glass substrate, for example. Moreover, the first active devices 1101-1110 are disposed on the first surface S1 of the first substrate 1010, as shown in FIG. 2A. In the present embodiment, the first active devices 1101-1110 may be thin film transistors. More specifically, each of the first active devices 1101-1110 includes a gate 1130, an active layer 1140, a source 1150, and a drain 1160, as shown in FIG. 2C. In the embodiment, the drain 1160 is respectively electrically connected to the corresponding first electrodes 1201-1210. Moreover, when the gate 1130 is driven, the source 1150 and the drain 1160 are electrically connected to each other through the active layer 1140. Accordingly, a voltage signal from the source 1150 can pass through the active layer 1101 and the drain 1160 in sequence and be transmitted to the corresponding first electrodes 1201-1210, as shown in FIG. 2C.

In other words, the first active devices 1101-1110 may serve as switches for the first electrodes 1201-1210. In the embodiment, the first electrodes 1201-1210 may also be respectively electrically connected to the storage capacitors C1-C10, so as to charge and discharge the storage capacitors C1-C10, as shown in FIGS. 2A and 2C. In the embodiment, an electrode (not drawn) of the storage capacitors C1-C10 respectively belongs to a same film layer as the gate 1130 in the first active devices 1101-1110, and another electrode (not drawn) of the storage capacitors C1-C10 belongs to a same film layer as the source 1150 or the drain 1160 in the first active devices 1101-1110.

Moreover, the first electrodes 1201-1210 are disposed on the first surface S1 of the first substrate 1010 and arranged in parallel to each other, as shown in FIGS. 1 and 2A. In the embodiment, the first electrodes 1201-1210 may be arranged as the long strips illustrated in FIG. 2A, in which the first electrodes 1201-1210 are separated by a spacing (not drawn) and are electrically insulated from each other. Specifically, the first electrodes 1201-1210 are respectively electrically connected to the corresponding first active devices 1101-1110, as shown in FIG. 2A. In other words, each of the first active devices 1101-1110 may independently control each corresponding one of the first electrodes 1201-1210.

In the present embodiment, as an illustrative example, a material of the first electrodes 1201-1210 may be at least one of zinc oxide, indium tin oxide, indium zinc oxide, indium tin zinc oxide, aluminum tin oxide, aluminum zinc oxide, cadmium tin oxide, cadmium zinc oxide, gallium zinc oxide, or fluorinated tin oxide.

Continuing reference to FIGS. 1 and 2A-2C, the second substrate 1020 is disposed opposite to the first substrate 1010, and the second active device 1400 is disposed on the second substrate 1020. In the present embodiment, the second substrate 1020 has a third surface S3 and a fourth substrate S4, and the second active device 1400 is disposed on the fourth surface S4 of the second substrate 1020, as shown in FIGS. 2A and 2B. Moreover, the second substrate 1020 may be a transparent substrate such as a glass substrate.

In FIG. 2B, the second active device 1400 may also be a thin film transistor. More specifically, the second active device 1400 includes a gate 1430, an active layer 1440, a source 1450, and a drain 1460, as shown in FIG. 2C. In the embodiment, the drain 1460 of the second active device 1400 is electrically connected to the second electrode 1500. Moreover, when the gate 1430 of the second active device 1400 is driven, the source 1450 and the drain 1460 of the second active device 1400 are electrically connected to each other through the active layer 1440. Accordingly, the voltage signal from the source 1450 can pass through the active layer 1440 and the drain 1460 in sequence and be transmitted to the second electrode 1500, as shown in FIG. 2C.

In the embodiment, the second electrode may also be respectively electrically connected to the storage capacitor C11, so as to charge and discharge the storage capacitor C11, as shown in FIGS. 2B and 2C. In the embodiment, an electrode (not drawn) of the storage capacitor C11 belongs to a same film layer as the gate 1430 in the second active device 1500, and another electrode (not drawn) of the storage capacitor C11 belongs to a same film layer as the source 1450 or the drain 1460 in the second active device 1500.

Moreover, the second electrode 1500 is disposed on the fourth surface S4 of the second substrate 1020 and is electrically connected to the second active device 1400, and the second electrode 1500 has an opening W1, as shown in FIGS. 1 and 2B. In the present embodiment, the second active device 1400 is adapted to serve as a switch for the second electrode 1500. Moreover, the second electrode 1500 may be made of the transparent conductive materials as described previously for the first electrodes 1201-1210. In addition, a material of the second electrode may also be an opaque conductive material, such as a metal with a preferred conductive property.

Continuing reference to FIGS. 1 and 2A-2C, the first alignment layer 1300 is disposed on the first surface S1 of the first substrate 1010 and covers the first electrodes 1201-1210. The second alignment layer is disposed on the third surface S3 of the second substrate 1020. In the embodiment, an alignment direction of the first alignment layer 1300 is parallel and reverse to an alignment direction of the second alignment layer 1600, as an illustrative example. In other embodiments, the alignment direction of the first alignment layer 1300 may also be perpendicular to the alignment direction of the second alignment layer 1600, and may be adjusted according to the type of liquid crystal molecules used by a user, so the foregoing serves only as an example for description.

In addition, the liquid crystal layer 1700 is disposed between the first substrate 1010 and the second substrate 1020, as shown in FIG. 1. Since the alignment directions of the first and second alignment layers 1300 and 1600 are different, therefore the alignment layers 1300 and 1600 align the liquid crystal layer 1700.

According to the afore-described structure, the liquid crystal layer 1700 disposed between the first substrate 1010 and the second substrate 1020 can control the first electrodes 1201-1210 through first active devices 1101-1110 on the first substrate 1010, and control the second electrode 1500 through the second active device 1400 on the second substrate 1020. Moreover, a voltage difference between the first electrodes 1201-1210 and the second electrode 1500 enables the liquid crystal layer 1700 to generate a refractive index variation. Moreover, since the second electrode 1500 has the opening W1, an overall refractive index distribution of the liquid crystal layer 1700 disposed in the opening W1 is different. In other words, an electric field distribution forming between the first substrate 1010 and the second substrate 1020 gradually decreases in a direction where the edge of the opening W1 approaches the center of the opening W1. Accordingly, the liquid crystal layer 1700 located in the opening W1 may form a refractive index distribution of a gradient-index lens (GRIN lens), and thereby obtain a light focusing function similar to a convex lens. In addition, this focusing effect may be respectively controlled by the magnitude of the driving signal applied on the first active devices 1101-1110 and the second active device 1400. In practice, the liquid crystal lens 1000 may be operated in the operating modes described below.

For example, the potentials respectively applied by the first active devices 1101-1110 on the first electrodes 1201-1210 are the same, and the potential applied by the second active device 1400 on the second electrode 1500 is not the same as the potentials on the first electrodes 1201-1210. Accordingly, the electric field distribution between the first substrate 1010 and the second substrate 1020 gradually decreases in the direction where the edge of the opening W1 approaches the center of the opening W1, thereby achieving the afore-described effect. In another embodiment, the first active devices 1101-1110 may also be used to control the potential on each of the first electrodes 1201-1210 (e.g., the potentials on the first electrodes 1201-1210 may be different from each other or at least partially different). The user may freely adjust the foregoing according to specific requirements, and thereby finely tune the overall refractive index distribution to obtain an optimized optical performance.

Moreover, since the liquid crystal molecules are a birefringent material for two different polarization directions of an incident beam of a specific incident direction, a refractive index thereof constitutes an extraordinary ray (E-ray) refractive index ($n_e$), and an ordinary ray (O-ray) refractive index ($n_o$). Therefore, in order to prevent an incident beam L1 generating a double foci phenomenon on an image plane S101 after passing through the liquid crystal lens 1000, the polarizer 1800 is disposed at a side of the second substrate 1020, and the second substrate 1020 is disposed between the first substrate 1010 and the polarizer 1800, as shown in FIG. 1. Accordingly, when the incident beam L1 forms an image on the image plane S101 after passing through the polarizer 1800, only a light beam having one polarization direction could pass through, and a light beam having another polarization direction would be blocked. Thereby, the double foci phenomenon is prevented and a preferred optical imaging quality is achieved.

Figure 3:
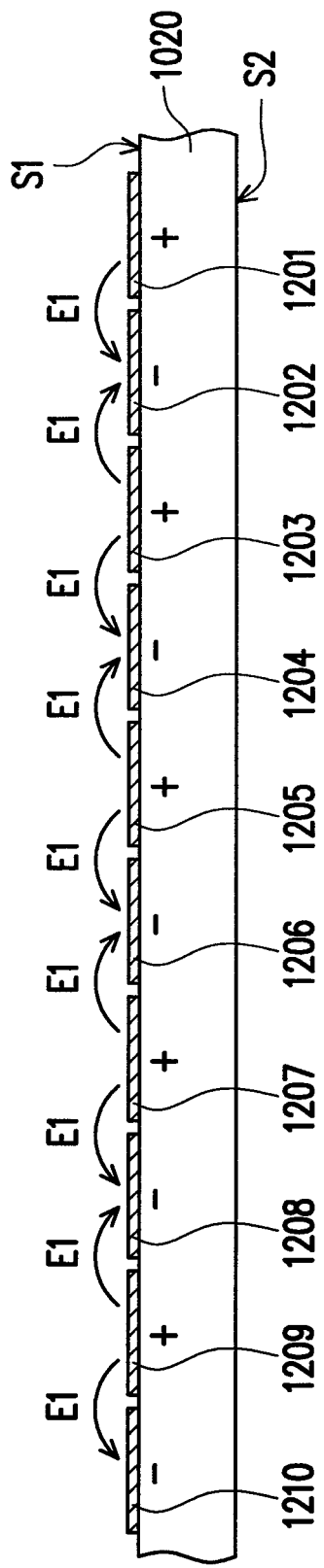
FIG. 3 is a schematic view of an electric field distribution when the liquid crystal lens depicted in FIG. 1 is operating.

Moreover, when the liquid crystal lens 1000 is operating, a mechanism for rotating the liquid crystal molecules in the liquid crystal layer 1700 typically requires applying a voltage higher than a threshold voltage of the liquid crystal molecules for rotation, and the higher the applied voltage value, the faster the rotational speed. However, during the process of operating the liquid crystal lens 1000, a mechanism for toppling down the liquid crystals typically relies on an inherent recovery of the liquid crystals, thus requiring a longer time. Therefore, in order to increase the rotational speed of the liquid crystals, the first electrodes 1201-1210 of the present embodiment applies different voltages and simultaneously generate an electric field parallel to the alignment direction of the liquid crystals, thereby effectively increasing the toppling speed of the liquid crystals. For example, when a potential distribution of the first electrodes 1201-1210 is configured at alternating high-low levels as shown in FIG. 3, a parallel electric field E1 is formed between the first electrodes 1201-1210, as shown in FIG. 3. Therefore, the toppling speed of the liquid crystal molecules may be increased by voltage control. In other words, the liquid crystal lens 1000 of the present embodiment has a preferred response speed during operation.

Further, since the liquid crystal lens 1000 of the present embodiment employs the active devices 1101-1110 and 1400 to respectively control the potentials of the first electrodes 1201-1210 and the second electrode 1500, therefore, besides being capable of suitably reducing the overall size of the liquid crystal lens 1000, a preferred electrical performance and a reduced use of external ICs are achieved, hence lowering a production cost.

In the present embodiment, the liquid crystal lens 1000 further includes a sealant 1900, as shown in FIG. 1. The sealant is disposed between the first substrate 1010 and the second substrate 1020, so as to respectively retain a containing space between the first alignment layer 1300 and the second alignment layer 1600, in which the liquid crystal layer 1700 is disposed in the containing space H1. Generally speaking, typically an adhesive agent is disposed on the first substrate 1010 or the second substrate 1020, the first substrate 1010 and the second substrate 1020 are aligned and attached, and after the adhesive agent is cured, the aforementioned sealant 1900 is formed. In the present embodiment, the sealant 1900 employs, for example, a plastic framing technique for sealing a liquid crystal display (LCD) panel, or other suitable plastic framing techniques and materials. The foregoing merely serves as an illustrative example, and the present invention is not limited thereto. In an embodiment of the invention, the aforementioned sealant 1900 may also be a spacer.

Figure 4:
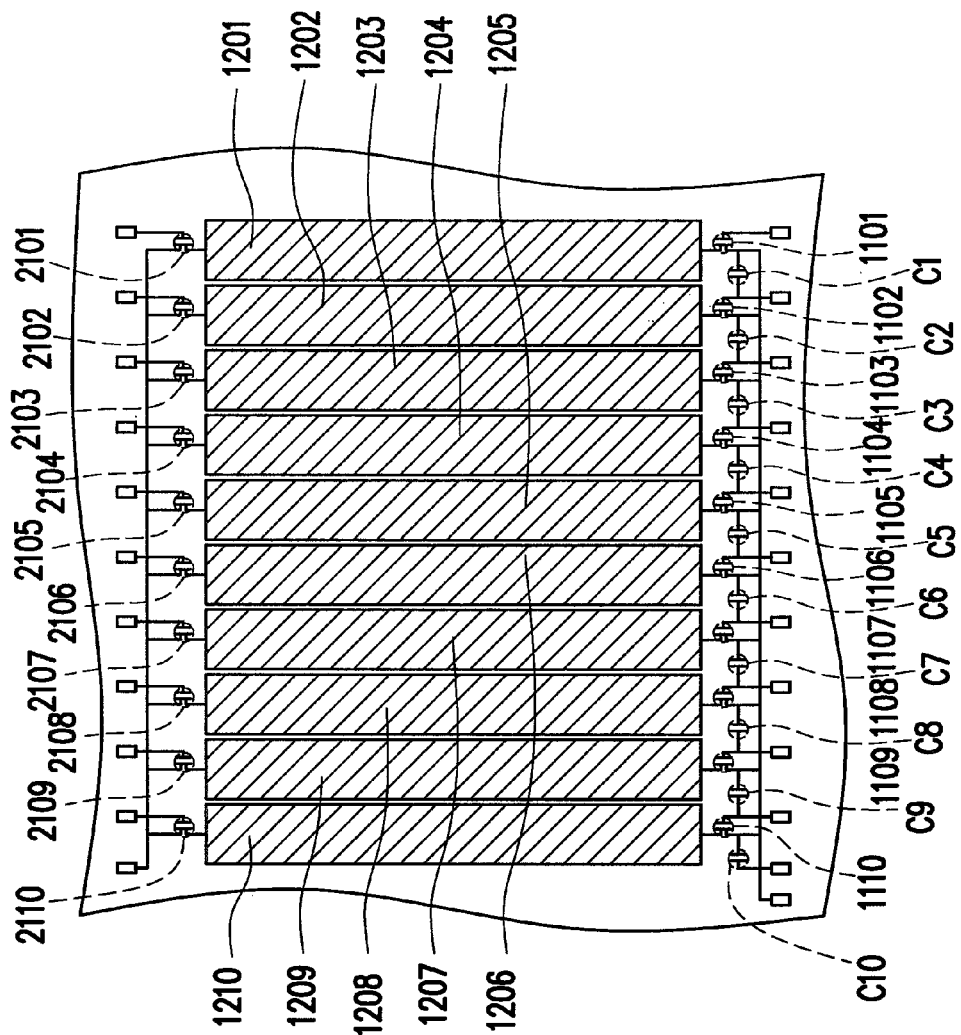
FIG. 4 is a schematic view of another implementation of the liquid crystal lens depicted in FIG. 1.

In an embodiment, in order for the afore-described liquid crystal lens 1000 to be suitable for operation in a low temperature environment, a plurality of third active devices 2101-2110 may be further disposed on the first substrate 1010, in which the third active devices 2101-2110 are respectively electrically connected to the corresponding first electrodes 1201-1210, as shown in FIG. 4. More specifically, when the first active devices 1101-1110 and the third active devices 2101-2110 are simultaneously driven, a current is respectively generated on the first electrodes 1201-1210. The current flowing through the first electrodes 1201-1210 may raise a temperature of the first electrodes 1201-1210, thereby increasing the temperature of the liquid crystal layer 1700. Accordingly, the liquid crystal lens 1000 can be used in a low temperature environment.

Figure 5:
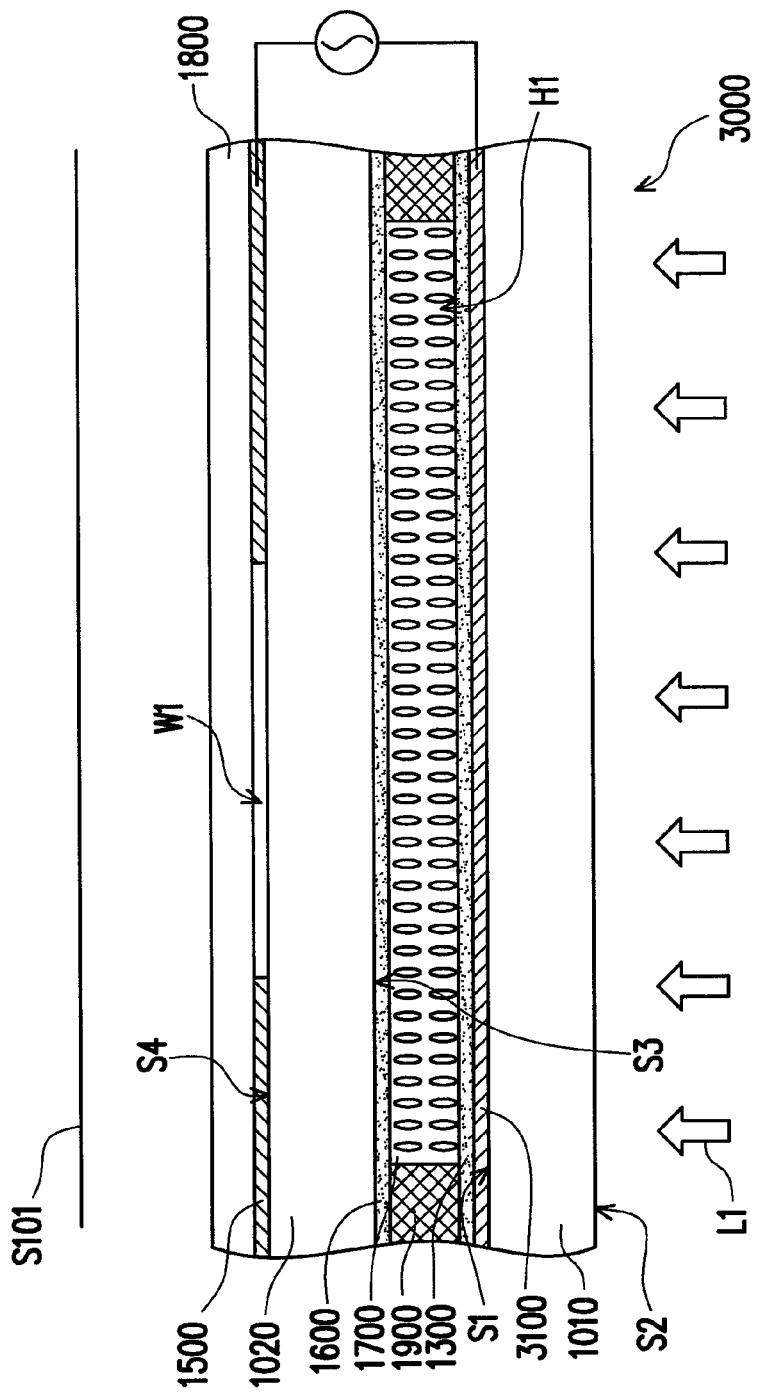
FIG. 5 is a partial schematic view of a liquid crystal lens according to another embodiment of the invention.
Figure 6:
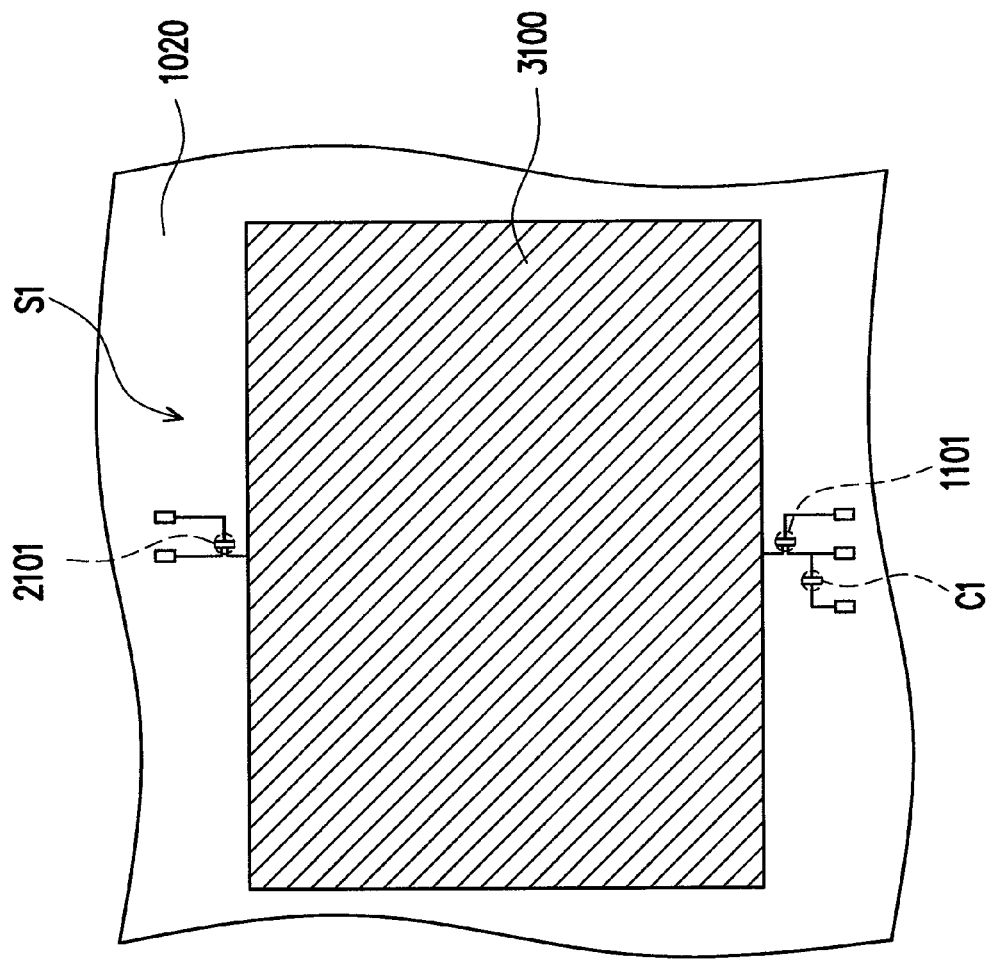
FIG. 6 is a partial schematic view of a first active device and a first electrode disposed on a first substrate depicted in FIG. 5.

FIG. 5 is a partial schematic view of a liquid crystal lens according to another embodiment of the invention. FIG. 6 is a partial view of a first active device and a first electrode disposed on a first substrate depicted in FIG. 5. Referring to FIGS. 1, 4, 5, and 6, a liquid crystal lens 3000 of the present embodiment is similar to the structure of the afore-described liquid crystal lens 1000, and the same elements are labeled with the same reference labels. A difference therebetween is that, compared to the first electrodes 1201-1210 on the first substrate 1010 of the liquid crystal lens 1000, the liquid crystal lens 3000 of the present embodiment has an electrode design of a single first electrode 3100 on the first substrate 1010, as shown in FIGS. 5 and 6.

In the embodiment, since there is only one first electrode 3100, therefore only one of the first active device 1101, the third active device 2101, and the storage capacitors needs to be electrically connected to the first electrode 3100, as shown in FIG. 6. In other words, by simultaneously driving the first active device 1101 and the third active device 2101 and generating a current on the first electrode 3100, the current flowing through the first electrode 3100 may raise the temperature of the first electrodes 3100, thereby increasing the temperature of the liquid crystal layer 1700. Accordingly, the liquid crystal lens 3000 can be used in a low temperature environment.

Figure 7:
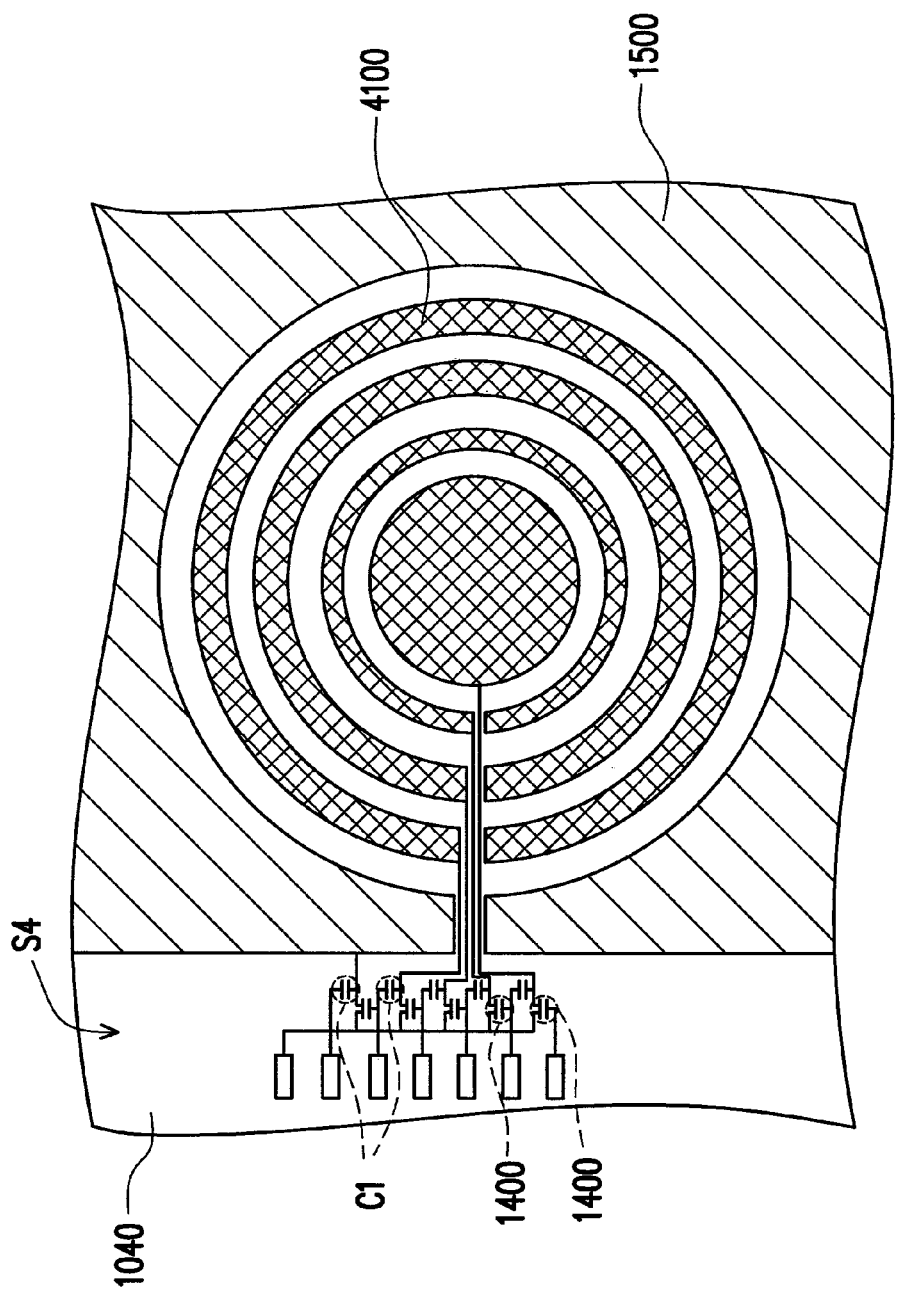
FIG. 7 is a schematic view of another implementation of the liquid crystal lenses depicted in FIGS. 1 and 5.

In the afore-described liquid crystal lenses 1000 and 3000, at least one ring shaped electrode 4100 may be further included in the liquid crystal lenses 1000 and 3000. The ring shaped electrode 4100 is disposed on the second substrate 1020 and in the opening W1 of the second electrode 1500, as shown in FIG. 7. In the embodiment, a number of the ring shaped electrode 4100 is four, for example, although the invention is not limited thereto. Accordingly, a plurality of second active devices 1400 are respectively electrically connected to the ring shaped electrodes 4100. In other words, the second active devices 1400 are respectively electrically connected to the second electrode 1500 and the corresponding ring shaped electrode 4100. In the present embodiment, the ring shaped electrodes 4100 disposed in the opening W1 may also be arranged as concentric circles, and at least a part of the potentials applied on the second electrode 1500 and the ring shaped electrodes 4100 is the same. Alternatively, the potentials applied on the second electrode 1500 and the ring shaped electrodes 4100 are different.

For example, for a typical positive single axis liquid crystal ($n_e > n_o$), if a lower potential is applied near the inner circle of the ring shaped electrodes 4100, and a higher potential is applied near the outer circle of the ring shaped electrodes 4100, than a phase delay of the liquid crystal layer 1700 near the inner circle is greater than a phase delay of the liquid crystal layer 1700 near the outer circle. Accordingly, overall the liquid crystal lenses 1000 and 3000 can obtain an optical effect of a positive lens. Conversely, if the higher potential is applied near the inner circle of the ring shaped electrodes 4100, and the lower potential is applied near the outer circle of the ring shaped electrodes 4100, than the phase delay of the liquid crystal layer 1700 near the inner circle is less than the phase delay of the liquid crystal layer 1700 near the outer circle. Accordingly, overall the liquid crystal lens 1000 and 3000 can obtain an optical effect of a negative lens. In other words, by using a design of the afore-described voltages, the liquid crystal lenses 1000 and 3000 can be operated to have focusing modes such as no focusing property (outer and inner circles having the same voltage), a focusing property of a positive lens (outer circle voltage higher than inner circle voltage), and a focusing property of a negative lens (outer circle voltage lower than inner circle voltage), thereby achieving one of the preferred effect of the liquid crystal lenses 1000 and 3000 of the present embodiment.

It should be noted that, the liquid crystal lenses depicted in FIGS. 1 and 5 are driven by sharing a same driving power source. However, in other embodiments, different driving power sources may be used for the actuation.

In view of the foregoing, the liquid crystal lens according to the embodiments of the invention has at least the following advantages. First, by disposing a plurality of first electrodes on the first substrate, and employing a plurality of active devices to suitably control the voltage on the liquid crystal lens, the refractive index distribution of the GRIN lens may be obtained, which has the focusing function of light focusing/dispersing similar to the convex/concave lens. In addition, since a plurality of first electrodes are configured, therefore, by adjusting the potentials on the first electrode and generating a parallel electric field, the mechanism for toppling the liquid crystals is sped up. In other words, the liquid crystal lens has a fast response time.

Moreover, since the liquid crystal lens employs active devices (e.g., thin film transistors) to control the refractive index of the liquid crystal layer therein, therefore, besides effectively reducing the overall size of the liquid crystal lens, the use of external ICs is also decreased, lowering the production cost and simplifying the structure of the liquid crystal lens. Further, since the liquid crystal lens has a plurality of ring shaped electrodes disposed in the opening, hence by finely adjusting the voltage applied on each of the ring shaped electrode, the liquid crystal lens can have a preferred optical performance.

In addition, other active devices may be disposed on the first substrate of the liquid crystal lens according to the embodiments of the invention. These active devices are electrically connected to the first electrodes and are adapted to generate a current with another active device on the first electrodes. Accordingly, the temperature of the liquid crystal layer is increased, and therefore the liquid crystal lens can be suitable for operation in a low temperature environment.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A liquid crystal lens, comprising:
a first substrate;
a plurality of first active devices disposed on the first substrate;
a plurality of first electrodes disposed on the first substrate and arranged in parallel to each other, the first electrodes respectively electrically connected to the corresponding first active devices;
a first alignment layer disposed on the first substrate and covering the first electrodes;
a second substrate disposed opposite to the first substrate;
a second active device disposed on the second substrate;
a second electrode disposed on the second substrate and electrically connected to the second active device, and the second electrode has an opening;
a second alignment layer disposed on the second substrate;
a liquid crystal layer disposed between the first substrate and the second substrate, and the first alignment layer and the second alignment layer align the liquid crystal layer; and
a polarizer disposed at a side of the second substrate, and the second substrate is disposed between the first substrate and the polarizer.

2. The liquid crystal lens as claimed in claim 1, further comprising a plurality of third active devices disposed on the first substrate and respectively electrically connected to the corresponding first electrodes, wherein when the first active devices and the third active devices are simultaneously driven, a current is respectively generated on the first electrodes, and the current flowing through the first electrodes increases a temperature of the first electrodes.

3. The liquid crystal lens as claimed in claim 1, wherein each of the first active devices comprises a gate, an active layer, a source, and a drain, the drain electrically connected to the corresponding first electrode, and when the gate is driven, the source and the drain are electrically connected to each other through the active layer.

4. The liquid crystal lens as claimed in claim 1, wherein the second active device comprises a gate, an active layer, a source, and a drain, the drain electrically connected to the corresponding second electrode, and when the gate is driven, the source and the drain are electrically connected to each other through the active layer.

5. The liquid crystal lens as claimed in claim 1, wherein a potential distribution applied on the first electrodes has alternating high-low levels, so as to respectively form a parallel electric field between the first electrodes.

6. The liquid crystal lens as claimed in claim 1, wherein the potentials applied on the first electrodes are the same with each other, and different from a potential applied on the second electrode.

7. The liquid crystal lens as claimed in claim 1, wherein when a plurality of second active devices are configured, the liquid crystal lens further comprises at least one ring shaped electrode disposed in the opening, and the second active devices are respectively electrically connected to the first electrode and the corresponding ring shaped electrode.

8. The liquid crystal lens as claimed in claim 7, wherein the at least one ring shaped electrode disposed in the opening is arranged as a concentric circle.

9. The liquid crystal lens as claimed in claim 7, wherein at least a part of the potentials applied on the second electrode and the at least one ring shaped electrode is the same.

10. The liquid crystal lens as claimed in claim 7, wherein the potentials applied on the second electrode and the at least one ring shaped electrode are different.

11. The liquid crystal lens as claimed in claim 1, wherein an alignment direction of the first alignment layer is parallel and reverse to an alignment direction of the second alignment layer, or the alignment direction of the first alignment layer is perpendicular to the alignment direction of the second alignment layer.

12. The liquid crystal lens as claimed in claim 1, wherein the second electrode is disposed at a side of the second substrate, and the second alignment layer is disposed at another side of the second substrate.

13. The liquid crystal lens as claimed in claim 1, wherein the first active devices and the second active device share a same driving power source, or different driving power sources are used respectively.

14. The liquid crystal lens as claimed in claim 1, further comprising a sealant disposed between the first substrate and the second substrate, so as to respectively retain a containing space between the first alignment layer and the second alignment layer, wherein the liquid crystal layer is disposed in the containing space.

15. A liquid crystal lens, comprising:
a first substrate;
a first active device disposed on the first substrate;
a first electrode disposed on the first substrate and electrically connected to the first active device;
a third active device disposed on the first substrate and electrically connected to the first electrode, wherein when the first active device and the third active device are simultaneously driven, a current is generated on the first electrode, and the current flowing through the first electrode increases a temperature of the first electrode;
a first alignment layer disposed on the first substrate and covering the first electrode;
a second substrate disposed opposite to the first substrate;
a second active device disposed on the second substrate;
a second electrode disposed on the second substrate and electrically connected to the second active device, and the second electrode has an opening;
a second alignment layer disposed on the second substrate;
a liquid crystal layer disposed between the first substrate and the second substrate, and the first alignment layer and the second alignment layer align the liquid crystal layer; and
a polarizer disposed at a side of the second substrate, and the second substrate is disposed between the first substrate and the polarizer.

16. The liquid crystal lens as claimed in claim 15, wherein when a plurality of second active devices are configured, the liquid crystal lens further comprises at least one ring shaped electrode disposed in the opening, and the second active devices are respectively electrically connected to the first electrode and the corresponding ring shaped electrode.

17. The liquid crystal lens as claimed in claim 16, wherein the at least one ring shaped electrode disposed in the opening is arranged as a concentric circle.

18. The liquid crystal lens as claimed in claim 16, wherein at least a part of the potentials applied on the second electrode and the at least one ring shaped electrode is the same.

19. The liquid crystal lens as claimed in claim 16, wherein the potentials applied on the second electrode and the at least one ring shaped electrode are different.

20. The liquid crystal lens as claimed in claim 15, wherein an alignment direction of the first alignment layer is parallel and reverse to an alignment direction of the second alignment layer, or the alignment direction of the first alignment layer is perpendicular to the alignment direction of the second alignment layer.

* * * * *